Figure 1:
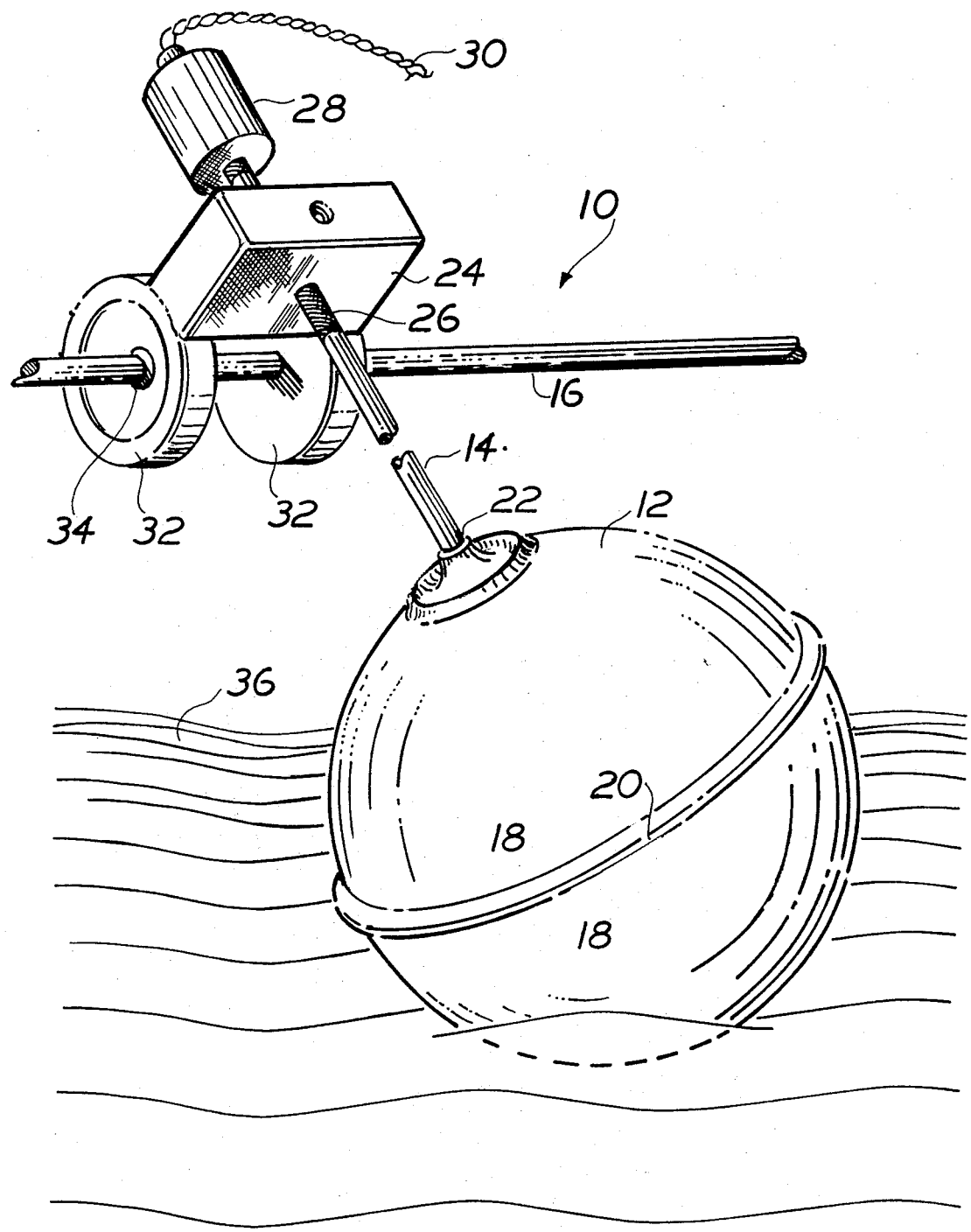

United States Patent [19]
Miller

[11] 3,866,470
[45] Feb. 18, 1975

[54] SELF-CONTAINED FLOAT DEVICE
[76] Inventor: Bernard J. Miller, Andorra Rd., Lafayette Hills, Pa. 19444
[22] Filed: Jan. 8, 1973
[21] Appl. No.: 321,887

[52] U.S. Cl. .................... 73/313, 73/322.5, 338/33, 340/244 B
[51] Int. Cl. .......................................... G01f 23/10
[58] Field of Search .................. 73/313, 317, 322.5; 338/33, 151; 340/244 B

[56] References Cited
UNITED STATES PATENTS

| | | | |
|---|---|---|---|
| 1,819,849 | 8/1931 | Stearns | 338/151 X |
| 2,616,004 | 10/1952 | Richards | 73/322.5 |
| 3,335,414 | 8/1967 | Meserow | 340/244 B |
| 3,393,283 | 7/1968 | Lenning | 73/322.5 X |
| 3,543,580 | 12/1970 | McGill | 73/313 |
| 3,681,988 | 8/1972 | McNulty | 73/313 |
| 3,774,449 | 11/1973 | Carol, Jr. | 73/13 |

Primary Examiner—Jerry W. Myracle
Assistant Examiner—Daniel M. Yasich
Attorney, Agent, or Firm—Caesar, Rivise, Bernstein & Cohen

[57] ABSTRACT

In a self-contained float device for measurement of liquid level, the device comprising a float that has a hollow interior, a support arm extends from the float and is pivotally secured to allow the float to rise and fall with change of liquid level in float displacement, the improvement comprising positioning internally contained indicating means within the float hollow interior with the indicating means being responsive to the float displacement.

3 Claims, 2 Drawing Figures

SELF-CONTAINED FLOAT DEVICE

This invention relates to a self-contained float device and has as its objective the provision of a highly novel and useful device.

There are many float devices in the patent literature and on the market and in many instances these devices have performed well. However, these devices tend to foul as time goes by even in a relatively mild atmosphere. In a more hostile atmosphere, like in sewage, fouling occurs almost immediately and thus it is difficult to maintain the operation of a float device in many atmospheres for any substantial period of time.

The problem with conventional float devices is that the change of level of the float is carried back to a sensing or indicating device which is normally subject to the environment in which the float is operating. Attempts have been made to protect the sensing or indicating device by introducing seals, but these are generally quickly worn away by the constant movement of the rod that is actuated by the float in a continuing manner.

In such prior floats, it has been determined that there is not only the problem of fouling and corrosion from the hostile atmosphere, but there is also the factor of friction which results in decreased sensitivity.

In view of the foregoing, it is an object of the present invention to provide a self-contained float device which is not subject to the fouling, corrosion and frictional effects of a prior float device;

Yet another object of the present invention is to provide a self-contained float device which can be easily maintained and wherein the sensing means is easily accessible and yet protected at all times;

Still another object of the present invention is to provide a self-contained float device wherein the sensing means are internally housed within the float itself, and thus the sensing means are completely protected at all times from hostile environment;

Yet another object of the present invention is to provide a self-contained float device that is relatively inexpensive in cost and yet which will have a long and useful life.

The foregoing as well as other objects of the invention are achieved by providing a self-contained float device which includes a float with a hollow interior, a support arm extending from the float and being pivotally secured to allow the float to rise and fall with change of liquid level in float displacement, the improvement comprising positioning internally contained sensing means within the float hollow interior with the indicating means being responsive to the float displacement.

Figure 2:
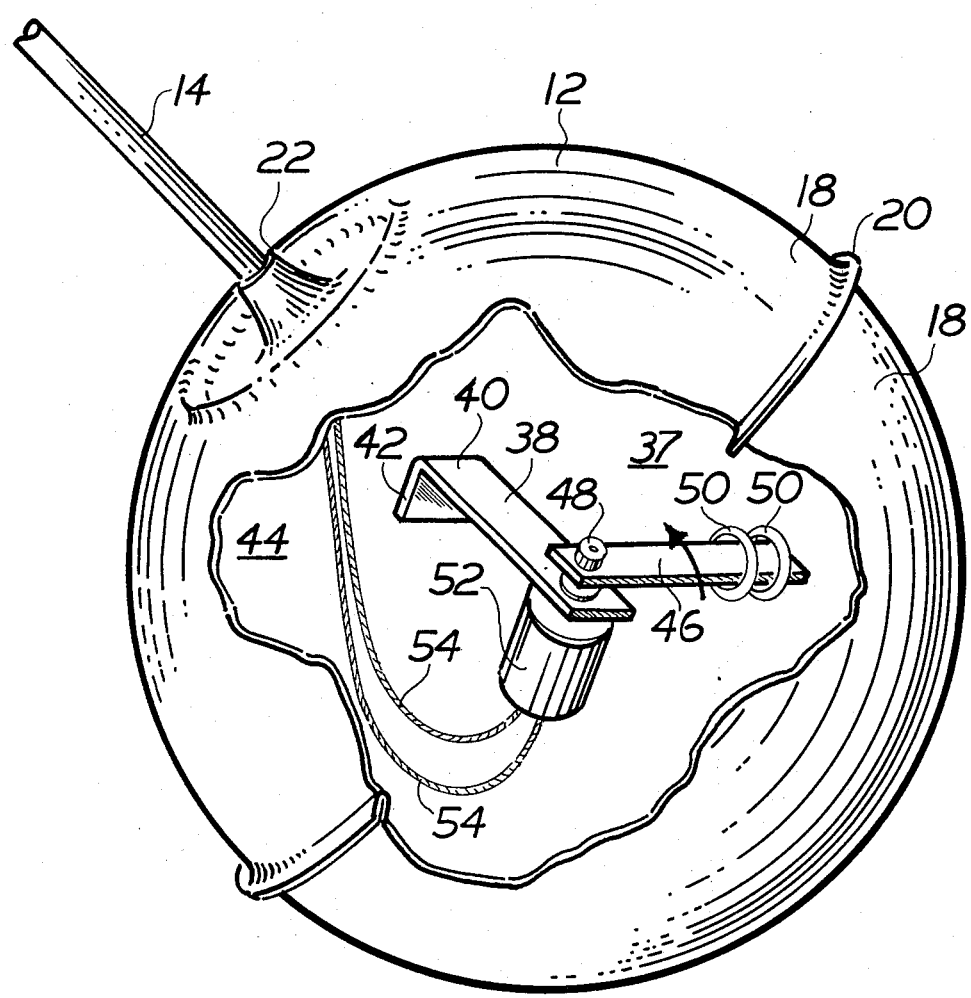

Other objects and many of the attendant advantages of the invention will become more readily apparent by reference to the attached drawings wherein:

FIG. 1 is a perspective view showing an embodiment of the self-contained float device of the present invention, with such device being in actual use in contact with a liquid; and FIG. 2 is an enlarged fragmentary perspective view showing the internally contained sensing means of the float of the invention.

Referring now in greater detail to the various figures of the drawing wherein like reference characters refer to like parts, there is shown at 10 in FIG. 1 a self-contained float device embodying the present invention. The device 10 is basically comprised of float 12 with hollow support tube 14 pivotally connecting the float 12 to horizontal rod 16.

As can be seen from both FIGS. 1 and 2, the float 12 is made of two hemispheres or float halves 18 that are secured together in a joint 20 preferably in a detachable manner although the joint could be made permanent if so desired. However, it is preferred that the joint 20 be detachable in the event it becomes necessary to achieve access to the hollow interior 37 of float 12. Where desired, the joint 20 may be provided with gaskets or other sealing aids and the two float halves 18 may snap together in a very tight and liquid proof manner or even clamping means (not shown) may be used.

The hollow support tube 14 is secured to the float 12 in a weld 22, with the tube leading back through a rectangular boss 24, the tube 14 being provided with a knurled surface 26. Also positioned about a tube 14 and remote from float 12, as shown in FIG. 1, is a housing 28 that carries certain electrical or electronic components that are actuated or which form a part of the circuit that includes the potentiometer or rheostat 52 (FIG. 2). Also shown in FIG. 1 are external leads 30*
that enter the upper end of the hollow tube 14. Suitable connections are made to the various electrical or electronic components in the housing 28 and then leads continue through the tube 14 and into the hollow interior 37 of float 12, as shown in FIG. 2.

*from a suitable power source

With further reference to FIG. 1 it will be seen that the actual pivoting of the float 12 on horizontal rod 16 is achieved through the use of bearing wheels 32 which possess generally central openings to receive the bearings 34 upon which the horizontal rod 16 is supported to allow pivoting of the bearing wheels 32. The boss 24 is welded or otherwise secured to the bearing wheels 32. With the foregoing arrangement, any rise or fall of the level of liquid 36 will result in the pivoting of the float 12 in float displaacement. With such float displacement, the tube 14 will pivot in one sense or another with respect to the horizontal rod 16. Such pivoting is allowed with the oscillation of the bearing wheels 32 about the horizontal rod 16.

Reference is now made to the hollow interior 37 of the float 12 as shown in FIG. 2. It will be seen that there is an arm 38 having a strap 40 and a perpendicular lug 42. The lug 42 is secured against the hollow interior wall 44 of the float 12. Extending from the strap 40 is an arm 46 that is pivotally attached through connection 48 to the strap 40. Also, the sensing arm 46 is directly connected to a revolvable member (not shown) within potentiometer 52. In this way, any change of position of sensing arm 46 causes a corresponding change of resistance in the potentiometer or rheostat 52.

As further shown in FIG. 2 weights 50 are provided about the indicating arm 46 in order to dampen excessive vibration.

From the foregoing it can be seen that each time the float 12 rises and falls there will be a change in the position of the sensing arm 46. This change of position takes the form of a displacement of the indicating arm 46 which is immediately conveyed to the potentiometer 52. The change in effective resistance of the potentiometer 52 is conveyed through leads 54 which pass through plug 56 and into the hollow bore of support tube 14 and then up to housing 28 and beyond. Hence, any displacement of the float 12 is immediately sensed through displacement of sensing arm 46, potentiometer 52 and the components in housing 28.

It therefore can be seen that the present invention provides internally contained sensing means which are not in any way subject to the hostile environment, fouling effects for corrosion of the liquid 36. There is no problem with frictional losses in view of the immediate responsive nature of the indicating arm 46.

It should be further understood that while the drawings show a direct mechanical response to the float displacement, that other forms of sensing means are contemplated. Thus, it is possible to provide within the interior of float 12 a position sensing transducer, a low torque potentiometer, a flexible member which can include a strain wire, a strain gauge, a mercury switch, an element of a variable capacitor or other variable component, means for interrupting a broad photoelectric beam and a low inertia selsyn with conversion to AC.

Furthermore, it is possible to minimize friction to a greater degree in the device of FIG. 1 by machining the bearing edge with the bearings 34 to a knife edge so that there is practically no loss of energy in the mechanical movement induced by the float displacement.

From the foregoing it can be seen that the arm 38 is gravity responsive and serves to actuate a potentiometer or other sensing means. It is preferable that the potentiometer or other sensing means also be maintained within the float. In some instances, the float may be made of a single piece of material with suitable access being provided.

Without further elaboration, the foregoing will so fully illustrate my invention that others may, by applying current or future knowledge, readily adapt the same for use under various conditions of service.

What is claimed as the invention is:

1. A self-contained float device for providing a signal which is indicative of a liquid level, the device comprising a float that has a hollow interior, a support arm extending from the float and being pivotably secured to first support means to allow the float to rise and fall with the change of liquid level in float displacement, the improvement comprising, sensing means disposed and sealed entirely within the hollow float interior and remote means disposed at a remote location outside said float, said sensing means comprising electrical means the language electrically connected to said remote means and for providing an electrical signal thereto, said signal being indicative of float displacement, second support means mounted on the interior of the float, and a pivotably mounted arm mechanically connected to said electrical means, said arm being gravity responsive, whereupon any change in float displacement causes said arm to pivot to thereby effect a corresponding change in the electrical signal provided by said electrical means to said remote means.

2. The device of claim 1 wherein said electrical means comprises a potentiometer.

3. The device of claim 2 wherein said arm includes weights thereon to dampen vibrations.

* * * * *

UNITED STATES PATENT OFFICE
CERTIFICATE OF CORRECTION

Patent No. 3,866,470         Dated February 18, 1975

Inventor(s) Bernard J. Miller

It is certified that error appears in the above-identified patent and that said Letters Patent are hereby corrected as shown below:

Column 2, line 39 "displaacement"
should be -- displacement --.

Claim 1, line 16 after "means"
delete "the language" and
insert -- having a movable element
and --

Signed and sealed this 15th day of April 1975.

(SEAL)
Attest:

RUTH C. MASON
Attesting Officer

C. MARSHALL DANN
Commissioner of Patents
and Trademarks